United States Patent
Li et al.

(10) Patent No.: US 7,087,852 B2
(45) Date of Patent: Aug. 8, 2006

(54) ELECTRIC DISCHARGE MACHINING OF AN INJECTION MOLDING CAVITY

(75) Inventors: Wenkuei Li, Taoyuan (TW); Long-Jyh Pan, Taoyuan (TW)

(73) Assignee: Benq Corporation, Taoyuan (TW)

( * ) Notice: Subject to any disclaimer, the term of this patent is extended or adjusted under 35 U.S.C. 154(b) by 0 days.

(21) Appl. No.: 10/950,005

(22) Filed: Sep. 23, 2004

(65) Prior Publication Data

US 2005/0061776 A1    Mar. 24, 2005

(30) Foreign Application Priority Data

Sep. 24, 2003  (TW) .............................. 92126374 A

(51) Int. Cl.
*B23H 9/00*    (2006.01)
*B23H 1/00*    (2006.01)

(52) U.S. Cl. .................................................. 219/69.17

(58) Field of Classification Search ............. 219/69.17; 451/28

See application file for complete search history.

(56) References Cited

U.S. PATENT DOCUMENTS 6,448,530 B1 *    9/2002    Fujita et al. .............. 219/69.17

FOREIGN PATENT DOCUMENTS

JP          10-86158 A    *    4/1998

* cited by examiner

*Primary Examiner*—Geoffrey S. Evans
(74) *Attorney, Agent, or Firm*—Ladas & Parry LLP

(57) ABSTRACT

A method for manufacturing an injection mold cavity is provided. A fixture, which has a hollow hole, is used by the method. The method comprises the following steps: first, fix the fixture on a non-machined cavity for forming an assembly; second, the non-machined cavity has a profile fitting approximately to the shape of the hollow hole, the fixture is fixed and position on the cavity; next, apply an electrical discharge machining procedure to the assembly with an electrode; next, applying a polishing procedure to the assembly; finally, removing the fixture from the assembly.

8 Claims, 8 Drawing Sheets

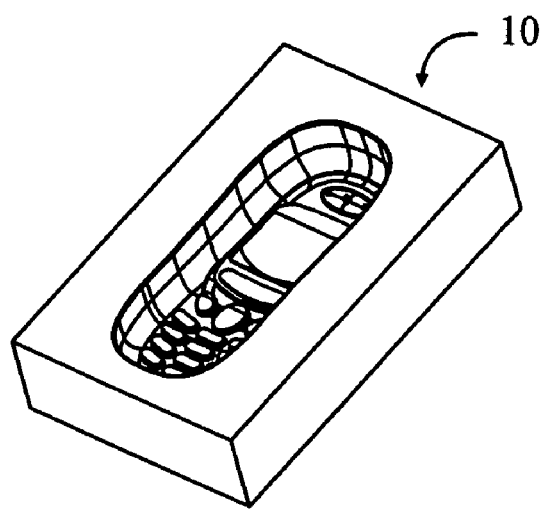
FIG. 1 (Prior Art)
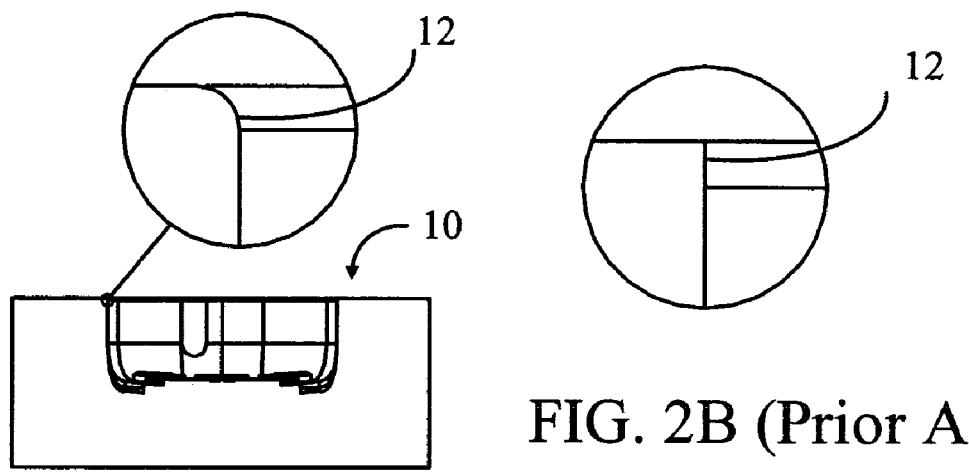
FIG. 2B (Prior Art)
FIG. 2A (Prior Art)

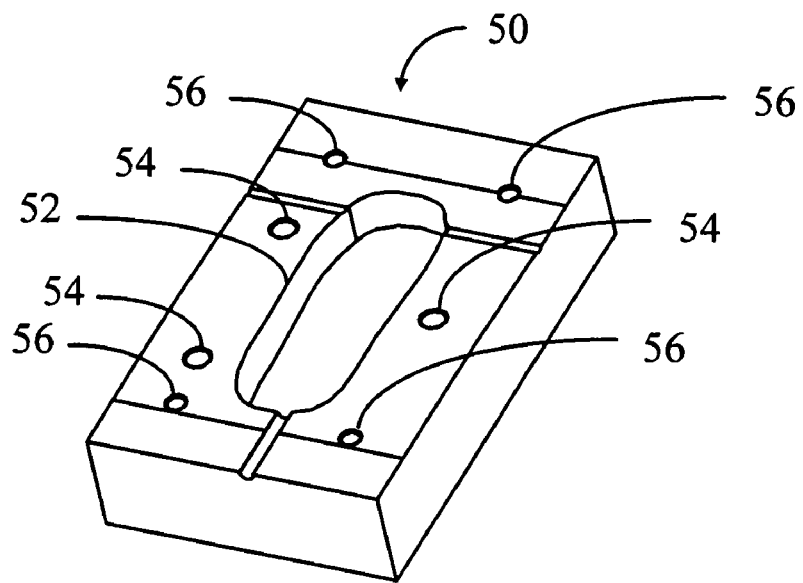
FIG. 4
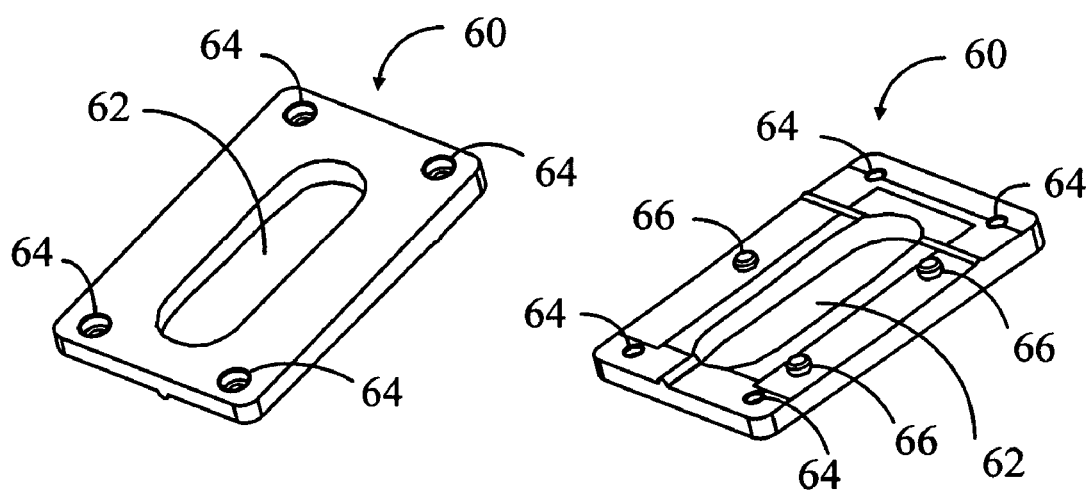
FIG. 5
FIG. 6

ELECTRIC DISCHARGE MACHINING OF AN INJECTION MOLDING CAVITY

CROSS-REFERENCE TO RELATED APPLICATIONS

This application claims priority under 35 U.S.C. § 119 to the prior Taiwanese Application No. 092126374 filed on Sep. 24, 2003.

BACKGROUND OF THE INVENTION

1. Field of the Invention

The present invention relates to a method for preventing deformation on the edge of the cavity of an injection mold cavity from over-polishing.

2. Description of the Prior Art

Multiple plastic injection products, such as housings of mobile phones, digital cameras . . . etc., are manufactured by using an injection mold cavity. One injection mold cavity is usually used for manufacturing thousands of injection products; therefore, the condition of an injection mold cavity affects the quality of the injection products. Normally, a polishing procedure must be applied to the injection mold cavity after a time period of usage, so as to assure the mold surface of the injection mold cavity smoother. However, during the polishing procedure, the mold edge of the injection mold cavity is often deformed due to over-polishing.

Referring to FIG. 1, FIG. 2A, and FIG. 2B, FIG. 1 is a schematic diagram of a conventional injection mold cavity 10. FIG. 2A is a schematic diagram of the deformed edge 12 of the injection mold cavity 10 shown in FIG. 1, FIG. 2B is a schematic diagram of the un-deformed edge 12B of the injection mold cavity 10 shown in FIG. 1. When over-polishing occurs, the unexpected deformation of the edge 12 of the injection mold cavity is approximately the same as shown in FIG. 2A, and the expected edge 12B of the injection mold cavity after manufacturing is shown in FIG. 2B. However, if the deformation continues, the injection mold cavity will eventually affect the injection products.

Referring to FIG. 3, FIG. 3 is a perspective view of the injection product 30 manufactured by the injection mold cavity 10 shown in FIG. 1. The injection product 30 is a front housing of a mobile phone having an assembling edge 32. From the sectional magnified view in FIG. 3, due to the deformation of the edge 12 of the injection mold cavity, the assembling edge 32 of the injection product forms a corresponding raise 33, or called "burr". The raise 33 is not the expected result when the injection product 30 is manufactured. However, it is not easy to prevent over-polishing from occurring in the conventional injection mold cavities because the deformation of the edge 12 of the injection mold cavities happens quite often. Therefore, the unexpected raise 33 appearing on the assembling edge 32 of the injection product is very common but affects the appearance a lot in the finish goods.

SUMMARY OF THE INVENTION

The main objective of the present invention is to provide a method for preventing the over-polishing phenomenon from affecting the edge of an injection mold cavity.

The present invention provides a method for preventing the edge of the injection mold cavity from chipping and deforming. The present invention protects the injection mold cavity by a fixture during polishing. The fixture has a hollow hole, which is approximately fit to the profile of the cavity of the injection mold. The method comprises the following steps: forming corresponding fixing structures and positioning structures on a non-machined mold cavity and the fixture. By the positioning structures, the fixture can be fixed on the non-machined mold cavity to become an assembly, and by the fixing structures, the opposite relation of the fixture and the non-machined cavity can remain fixed. An electrical discharge machining procedure is applied to the assembly with an electrode to form the desired shape and profile on the assembly. Then, a polishing procedure is applied to the assembly. Finally, after removing the fixing structures and the fixture, the finished injection mold cavity is formed.

The present invention prevents the over-polishing phenomenon of the edge of an injection mold cavity. By the method of the present invention, the present invention avoids the formation of burrs on the injection product.

The advantage and spirit of the invention may be understood by the following recitations together with the appended drawings.

BRIEF DESCRIPTION OF THE APPENDED DRAWINGS

FIG. 1 is a schematic diagram of a conventional injection mold cavity.

FIG. 2A is a schematic diagram of the deformed edge on the cavity of the injection mold cavity shown in FIG. 1.

FIG. 2B is a schematic diagram of the un-deformed edge on the profile of the injection mold cavity 10 shown in FIG. 1.

FIG. 4 is a schematic diagram of the non-machined cavity of the injection mold cavity according to the present invention.

FIG. 5 is a top view of the fixture according to the present invention.

FIG. 6 is a bottom view of the fixture shown in FIG. 5.

DETAILED DESCRIPTION OF THE INVENTION

Figure 3:
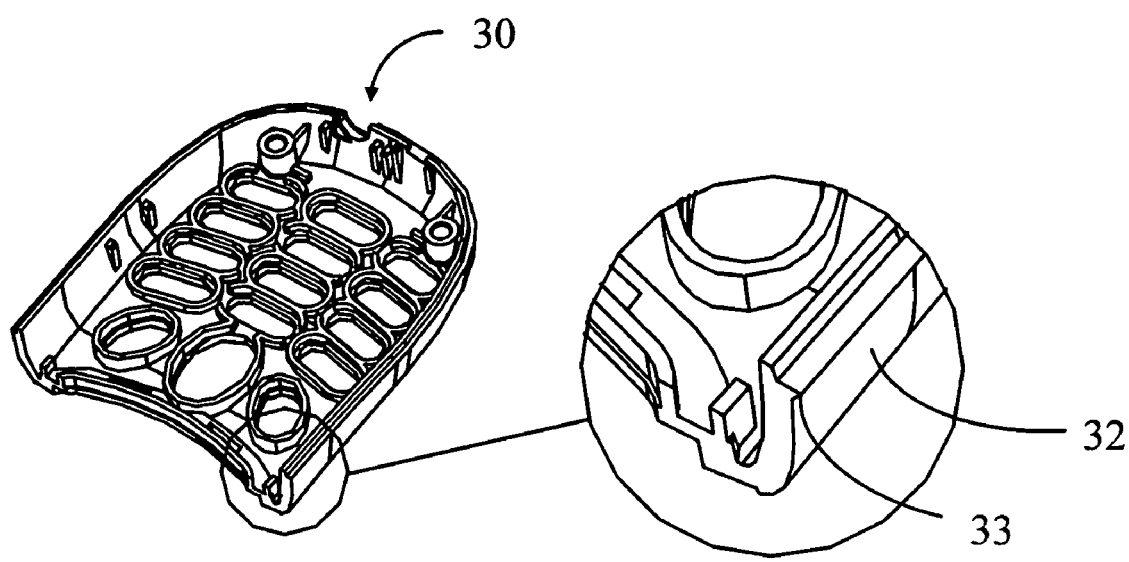
FIG. 3 is a perspective view of the injection product manufactured by the injection mold cavity shown in FIG. 1.

The present invention provides a method for manufacturing an injection mold cavity, which is able to prevent the edge deformation on the profile of the injection mold cavity from over-polishing. The present invention protects the injection mold cavity by a fixture during polishing. The fixture has a hollow hole fits approximately to the profile of the non-machined cavity. The so-call over-polishing means that the edge shape of the polished injection mold cavity has an un-expected deformation during polishing.

Referring to FIG. 4, FIG. 4 is a schematic diagram of the non-machined cavity 50 of the injection mold cavity according to the present invention. The non-machined cavity 50 of the injection mold cavity of the present invention has a cavity 52 and comprises three setting holes 54 and four screw holes 56.

Referring to FIG. 5 and FIG. 6, FIG. 5 is a top view of the fixture 60 according to the present invention, and FIG. 6 is a bottom view of the fixture 60 shown in FIG. 5. The present invention protects the injection mold cavity by a fixture 60 during polishing. The fixture 60 has a hollow hole 62, which approximately fits to the profile of the cavity 52 of the non-machined cavity 50. As shown in FIG. 5, the fixture 60 also comprises four screw holes 64 corresponded to the screw holes 56 of the non-machined cavity 50. As shown in FIG. 6, the fixture 60 also comprises three positioning columns 66 corresponded to the setting holes 54 of the non-machined cavity.

The non-machined cavity 50 is formed from a piece of steel milled with a cavity 52. In the embodiment, the steel of the non-machined cavity 50 is selected from the stainless steel of AISI 420 or of the same level. The fixture 60 is made by another softer material, for example, thermal treatment steel, which is softer than the steel used in the non-machined cavity 50. In a preferable embodiment, the steel used in the fixture 60 is pre-hardened plastic mould steel, for example, NAK 80®.

Figure 7:
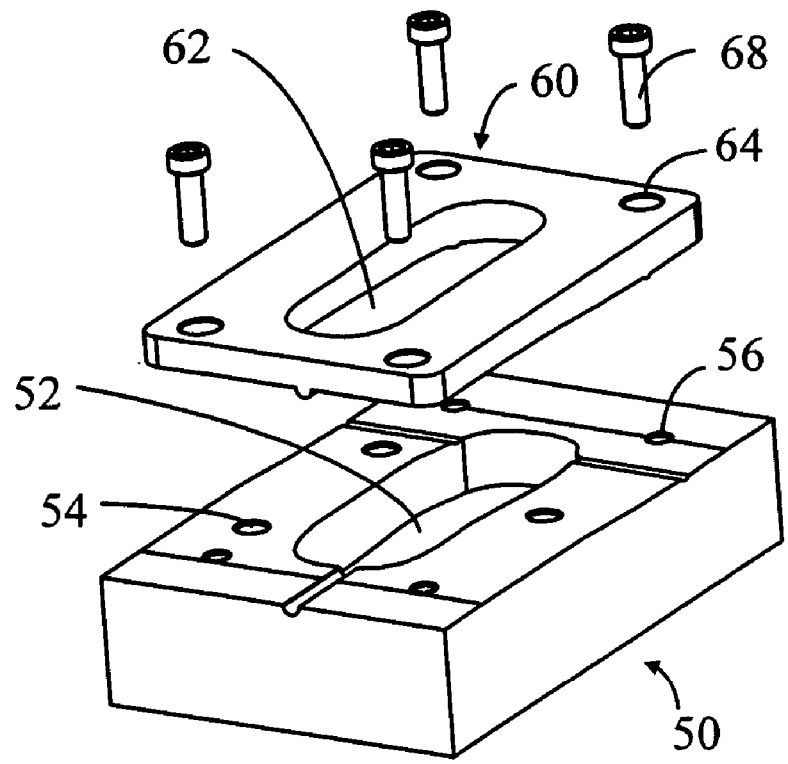
FIG. 7 is a blown up view before the fixture and the non-machined cavity are assembled.
Figure 8:
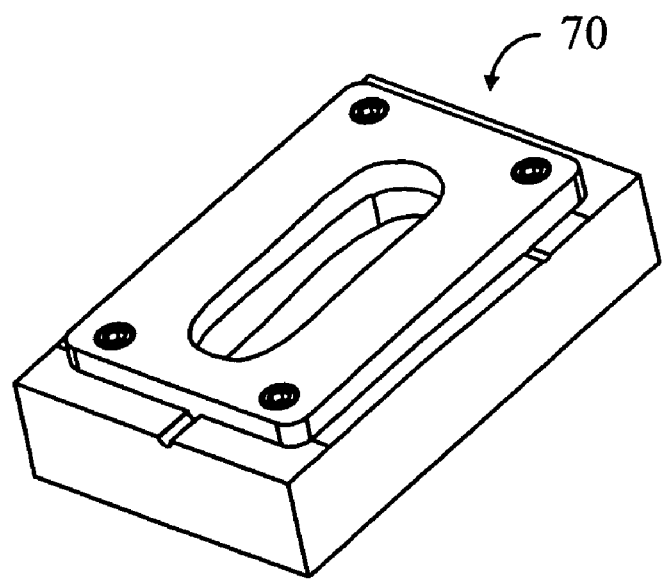
FIG. 8 is a schematic diagram of the assembly, consisted of the fixture and the non-machined cavity shown in FIG. 7.

Referring to FIG. 7 and FIG. 8, FIG. 7 is a blown up view before the fixture 60 and the non-machined cavity 50 are assembled, and FIG. 8 is a schematic diagram of the assembly 70 consisted of the fixture 60 and the non-machined cavity 50 shown in FIG. 7. The fixture 60 is assembled to the non-machined cavity 50 on a surface comprising the positioning column 66. The corresponding positioning structures formed by the positioning holes 54 of the non-machined cavity 50 and the positioning columns 66 of the fixture 60 fix the fixture 60 on the non-machined cavity 50 and align the hollow hole 62 to fit the profile of cavity 52. After that, the fixing structures, which are formed by the combination of the four corresponding screws 68 and screw holes 56 and the screw holes 64, keep the fixture 60 secured on the non-machined cavity 50. In other words, the fixture 60 can be fixed on the non-machined cavity 50 by the positioning structures and kept secured on the non-machined cavity 50 by the fixing structures. Therefore, the fixture 60 and the non-machined cavity 50 can be assembled into an assembly 70.

The positioning structure and the fixing structure can have various forms. For example, the positioning structure can form the positioning columns on the non-machined cavity 50, and the setting holes are formed on the fixture 60; that is known by the person who knows the skills well, and the related information will not be further described.

Figure 9:
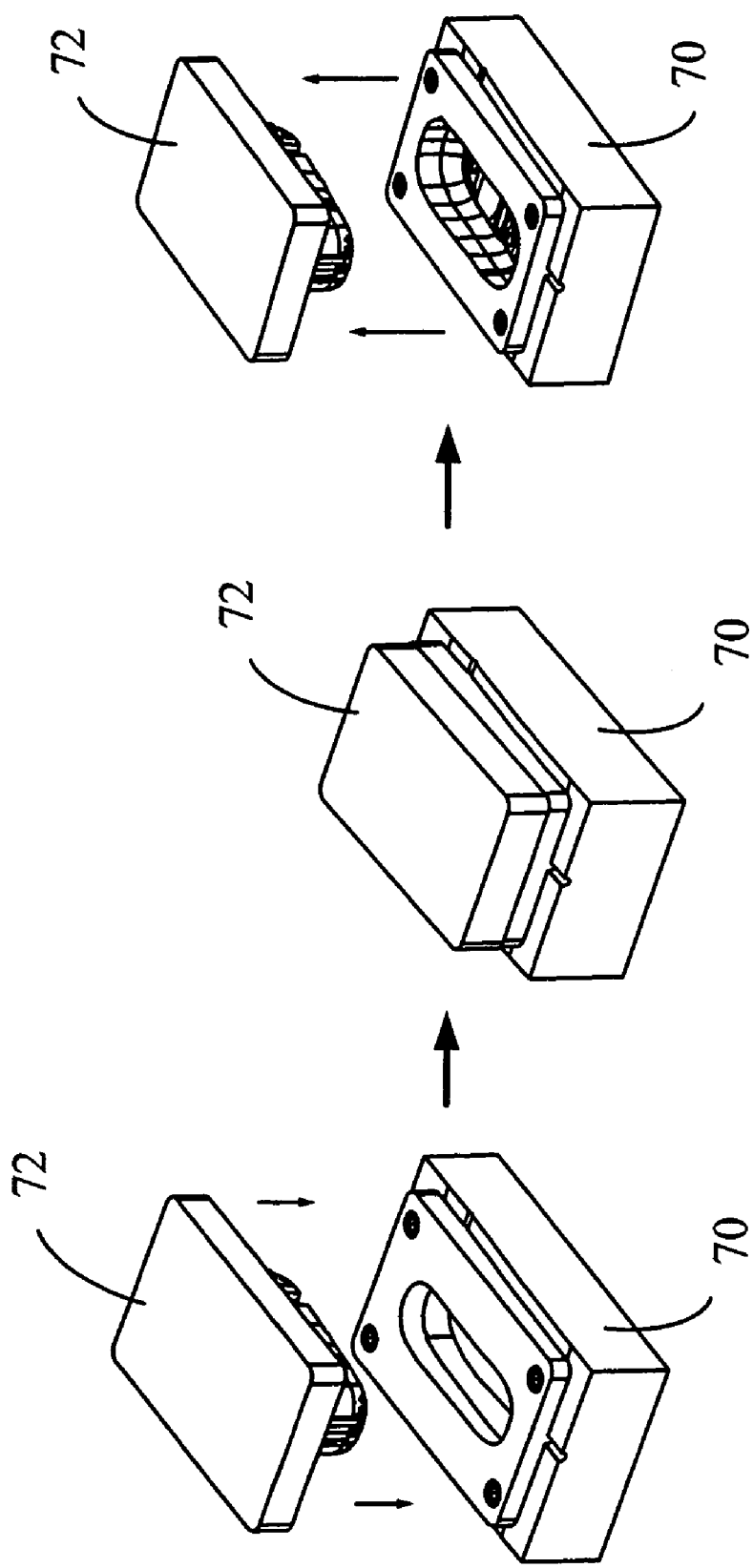
FIG. 9 is a schematic diagram while applying the electrical discharge machining (EDM) procedure to the assembly shown in FIG. 8.

Referring to FIG. 9, FIG. 9 is a schematic diagram while applying the electrical discharge machining (EDM) procedure to the assembly 70 shown in FIG. 8. The EDM procedure is applied to the assembly with an electrode 72 so as to form the desired shape and profile of the cavity 52.

Figure 10:
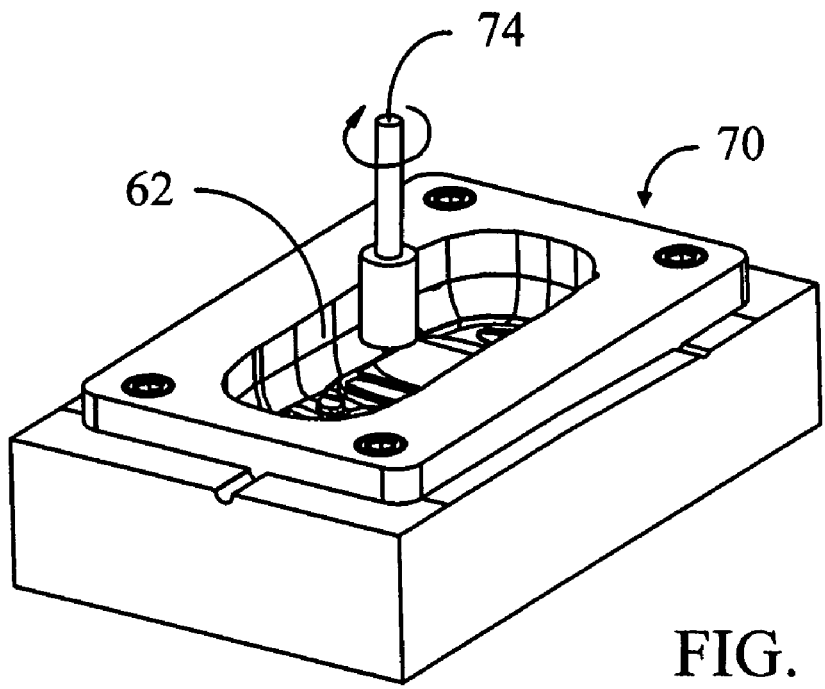
FIG. 10 is a schematic diagram while the polishing procedure is being applied to the assembly 70, after the EDM procedure shown in FIG. 9 has been applied.

Referring to FIG. 10, FIG. 10 is a schematic diagram while the polishing procedure is being applied to the assembly 70. After the EDM procedure, a polisher 74 applies the polishing procedure to the assembly 70, formed by the fixture 60 and the non-machined cavity 50. When applying the polishing procedure to the assembly 70, the over-polishing phenomenon only occurs on the edge of the hollow hole 62 of the fixture 60 and the edge of the profile of the non-machine cavity 50 is thus protected. Instead of the non-machined cavity 50, the present invention sacrifices the fixture 60 to during polishing, so as to keep the completeness of the edge on the profile of the injection mold cavity.

Figure 11:
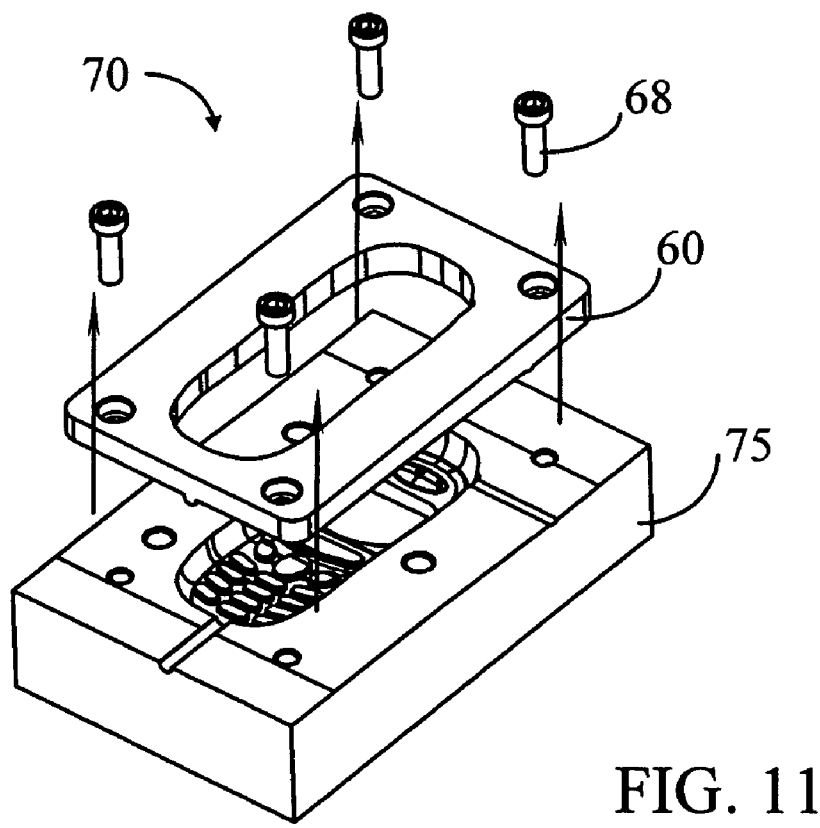
FIG. 11 is a blown up view of the assembly shown in FIG. 10.

Referring to FIG. 11, FIG. 11 is a blown up view of the assembly 70 shown in FIG. 10. After the polishing procedure, the screws 68 and the fixture 60 are removed from the assembly 70 and thus the injection mold cavity 75 is finished.

Figure 12:
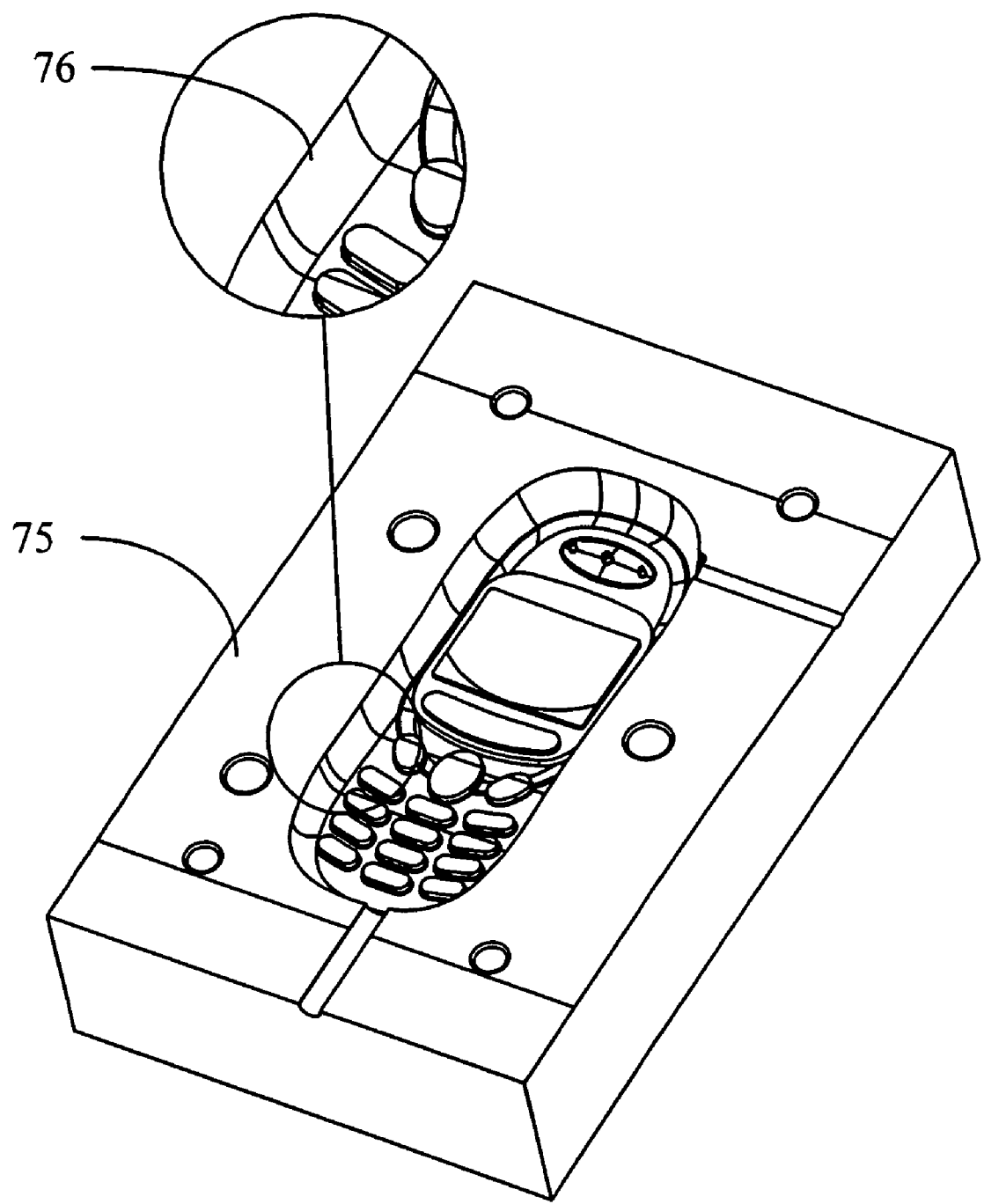
FIG. 12 is a schematic diagram of the final injection mold cavity of the present invention.

Referring to FIG. 12, FIG. 12 is a schematic diagram of the final injection mold cavity 75 of the present invention. The injection mold cavity 75 manufactured by the method of the present invention can avoid the over-polishing phenomenon by protecting the edge of the injection mold cavity 75 from being damaged. In the embodiment of FIG. 12, the injection mold cavity 75 is used for manufacturing the housing of a mobile phone. By implementing this invention, the burrs forming on the edge of the housing of a mobile phone is thus prevented.

For the injection mold cavity used in mass production, the edge of the cavity might be damaged and deformed after thousand times of plastic injection, and then re-polish is needed. At this moment, the positioning structures and the fixing structures are used to fix the fixture on the injection mold cavity, and then the polishing procedure is applied, so as to repair the damaged and deformed edge of the cavity of the injection mold.

Figure 13:
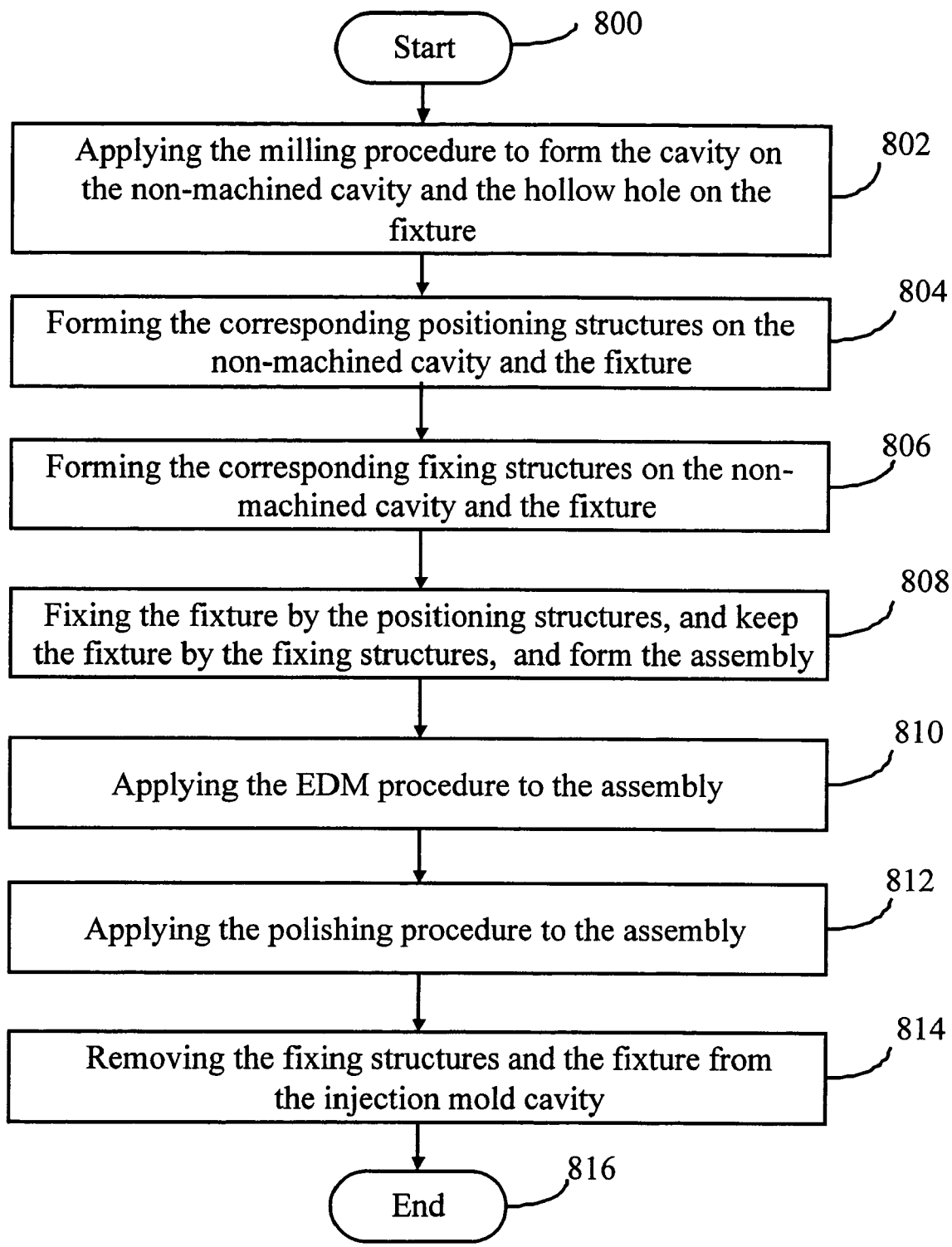
FIG. 13 is a flow chart of the manufacturing method of the injection mold cavity according to the present invention.

Referring to FIG. 13, FIG. 13 is a flow chart of the manufacturing method of the injection mold cavity according to the present invention. The method of the present invention is used for manufacturing injection mold cavities, such as the housing of a mobile phone or the housing of a digital camera. The method comprises the following steps:

Step 800: Start.

Step 802: Applying the milling procedure to form the cavity 52 on the non-machined cavity 50 and the hollow hole 62 on the fixture 60.

Step 804: Forming the corresponding positioning structures on the non-machined cavity 50 and the fixture 60, such as the positioning holes 54 and the positioning columns 66.

Step 806: Forming the corresponding fixing structures on the non-machined cavity 50 and the fixture 60, such as the screw holes 56 and 64.

Step 808: Fixing the fixture 60 on the non-machined cavity 50 by the positioning structures, and keep the fixture 60 secured on the non-machined cavity 50 by the fixing structures, so as to form the assembly 70.

Step 810: Applying the EDM procedure to the assembly 70.

Step 812: Applying the polishing procedure to the assembly 70.

Step 814: Removing the fixing structures and the fixture 60 from the injection mold cavity.

Step 816: End.

Comparing to the prior arts, the method of the present invention maintains the injection mold cavity by using a fixture; the fixture has a hollow hole, which approximately fits to the profile of the cavity of injection mold. By the protection of the fixture on the injection mold during the EDM procedure and the polishing procedure, the cavity edge of the injection mold is protected from damage and deformation. The present invention avoids the over-polishing phenomenon on the cavity edge and prevents burrs from appearing on the injection products, which are manufactured by the injection mold cavities through the later injection forming procedure.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A method for manufacturing an injection mold cavity by utilizing a fixture having a hollow hole, the method comprising the following steps:
    fixing the fixture on a non-machined cavity for forming an assembly, the non-machined cavity having a profile, the hole approximately fitting to the profile of the cavity;
    applying an electrical discharge machining procedure to the assembly with an electrode;
    applying a polishing procedure to the assembly; and
    removing the fixture from the assembly.

2. The method of claim 1, wherein the non-machined cavity is formed from a first steel milled with a central recess, and the fixture is formed from a second steel with the hollow hole.

3. The method of claim 2, wherein the second steel is softer than the first steel.

4. The method of claim 2, wherein the material of the first steel is stainless steel, and the material of the second steel is pre-hardened plastic mould steel.

5. The method of claim 1, wherein fixing structures are formed correspondingly on the non-machined cavity to fix the fixture on the non-machined cavity.

6. The method of claim 5, wherein the fixing structures comprise a plurality of screw holes correspondingly formed on the non-machined cavity and the fixture, the fixture can be fixed on the non-machined cavity for forming the assembly by fastening the screws to the screw holes.

7. The method of claim 1, wherein positioning structures are formed correspondingly on the non-machined cavity and the fixture for positioning the fixture on the non-machined cavity.

8. The method of claim 7, wherein the positioning structures comprise a plurality of positioning holes and a plurality of positioning columns correspondingly formed on the non-machined cavity for positioning the fixture on the non-machined cavity.

* * * * *